(12) United States Patent
Lu et al.

(10) Patent No.: US 10,817,052 B1
(45) Date of Patent: Oct. 27, 2020

(54) EYE EMULATOR DEVICES

(71) Applicant: Facebook Technologies, LLC, Menlo Park, CA (US)

(72) Inventors: Lu Lu, Seattle, WA (US); Yusufu Njoni Bamaxam Sulai, Bothell, WA (US); Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 146 days.

(21) Appl. No.: 15/866,349

(22) Filed: Jan. 9, 2018

(51) Int. Cl.
| | |
|---|---|
| *A61B 3/107* | (2006.01) |
| *G06F 3/01* | (2006.01) |
| *G06T 19/00* | (2011.01) |
| *G06F 11/36* | (2006.01) |
| *G02B 27/09* | (2006.01) |

(52) U.S. Cl.
CPC ............ *G06F 3/013* (2013.01); *G06T 19/006* (2013.01); *G02B 27/095* (2013.01); *G06F 11/36* (2013.01)

(58) Field of Classification Search
CPC .............. G02B 27/0172; G02B 27/286; G02B 2027/0116; G02B 27/0025; G02B 3/14; G02B 2027/011; G02B 2027/0138; G02B 2027/0174; G02B 27/0093; G02B 27/0911; G02B 27/26; G02B 27/288; G02B 27/4261; G02B 5/3016; G02B 27/0101; G02F 1/292; G02F 2001/294; G02F 1/29; G02F 1/133528; G02F 2001/133541; G02F 2001/133638; G02F 2001/13706; G02F 1/133526; G06F 3/013; A61B 3/0025; A61B 3/102; A61B 3/1015; A61B 3/107; A61B 3/1005
See application file for complete search history.

(56) References Cited

U.S. PATENT DOCUMENTS

| | | | | |
|---|---|---|---|---|
| 5,900,923 | A  * | 5/1999 | Prendergast ........... | G09B 23/28 351/211 |
| 6,417,892 | B1 * | 7/2002 | Sharp .................... | G02B 27/288 348/742 |
| 6,626,535 | B2 * | 9/2003 | Altmann ................ | G09B 23/28 351/159.73 |
| 7,036,933 | B2 * | 5/2006 | Yamaguchi ............. | A61B 3/00 351/205 |
| 7,742,244 | B2 * | 6/2010 | Liu ....................... | A61B 3/0025 351/205 |
| 8,130,450 | B2 * | 3/2012 | Gotzinger ............... | A61B 3/09 359/666 |

(Continued)

*Primary Examiner* — Balram T Parbadia
(74) *Attorney, Agent, or Firm* — Fenwick & West LLP

(57) ABSTRACT

Described herein is a human eye emulator device that emulates the human eye's responses to light. The human eye emulator device is based on an electro-optical liquid crystal eye model. The human eye emulator device includes a Pancharatnam berry phase (PBP) liquid crystal (LC) lens, a liquid crystal (LC) shutter glass, and a liquid crystal (LC) lens. The PBP LC lens emulates the cornea. The PBP LC lens receives light and refracts the received light. The LC shutter glass emulates the pupil. The LC shutter glass forms a dynamic aperture that transmits a portion of the light refracted by the PBP LC lens. The LC lens emulates the crystalline lens. The LC lens receives the portion of light transmitted by the LC shutter glass and refracts the received portion of light through the LC shutter glass onto an imaging surface.

17 Claims, 6 Drawing Sheets

(56) References Cited

U.S. PATENT DOCUMENTS

| | | | | |
|---|---|---|---|---|
| 9,310,601 B1* | 4/2016 | Jackson | | G02B 19/0014 |
| 2002/0085172 A1* | 7/2002 | Altmann | | G09B 23/28 |
| | | | | 351/178 |
| 2004/0246440 A1* | 12/2004 | Andino | | B29D 11/00086 |
| | | | | 351/159.74 |
| 2005/0024585 A1* | 2/2005 | Dai | | A61B 3/1015 |
| | | | | 351/205 |
| 2008/0267472 A1* | 10/2008 | Demos | | A61B 1/00009 |
| | | | | 382/128 |
| 2010/0002311 A1* | 1/2010 | Reichert | | A61B 3/0025 |
| | | | | 359/738 |
| 2011/0149242 A1* | 6/2011 | Gotzinger | | A61B 3/0025 |
| | | | | 351/206 |
| 2011/0181836 A1* | 7/2011 | Rowe | | A61B 3/102 |
| | | | | 351/205 |
| 2013/0242402 A1* | 9/2013 | Konig | | G02B 3/0087 |
| | | | | 359/630 |
| 2013/0308094 A1* | 11/2013 | Mohan | | A61B 3/0025 |
| | | | | 351/159.74 |
| 2014/0218674 A1* | 8/2014 | Chen | | G02F 1/29 |
| | | | | 349/200 |
| 2014/0285429 A1* | 9/2014 | Simmons | | G02B 27/225 |
| | | | | 345/156 |
| 2014/0347608 A1* | 11/2014 | Kato | | G02F 1/13 |
| | | | | 349/96 |
| 2015/0131053 A1* | 5/2015 | Copland | | G02B 27/48 |
| | | | | 351/206 |
| 2015/0219893 A1* | 8/2015 | Chen | | G02B 27/0025 |
| | | | | 349/200 |
| 2015/0323803 A1* | 11/2015 | Tung | | G02B 27/2214 |
| | | | | 359/465 |
| 2016/0041449 A1* | 2/2016 | Clark | | G02F 1/134309 |
| | | | | 623/6.56 |
| 2016/0106533 A1* | 4/2016 | Galstian | | A61B 3/103 |
| | | | | 623/6.18 |
| 2016/0329028 A1* | 11/2016 | Simmons | | G02B 27/0172 |
| 2017/0010466 A1* | 1/2017 | Klug | | G02B 27/0081 |
| 2018/0003963 A1* | 1/2018 | Benitez | | H04N 13/341 |
| 2018/0109783 A1* | 4/2018 | Austin | | G01M 11/0257 |
| 2018/0129018 A1* | 5/2018 | Cheng | | G02B 5/3008 |
| 2018/0131926 A1* | 5/2018 | Shanks | | G02B 26/106 |
| 2018/0143470 A1* | 5/2018 | Oh | | G02F 1/1347 |
| 2018/0364493 A1* | 12/2018 | Shirko | | H04N 9/317 |

\* cited by examiner

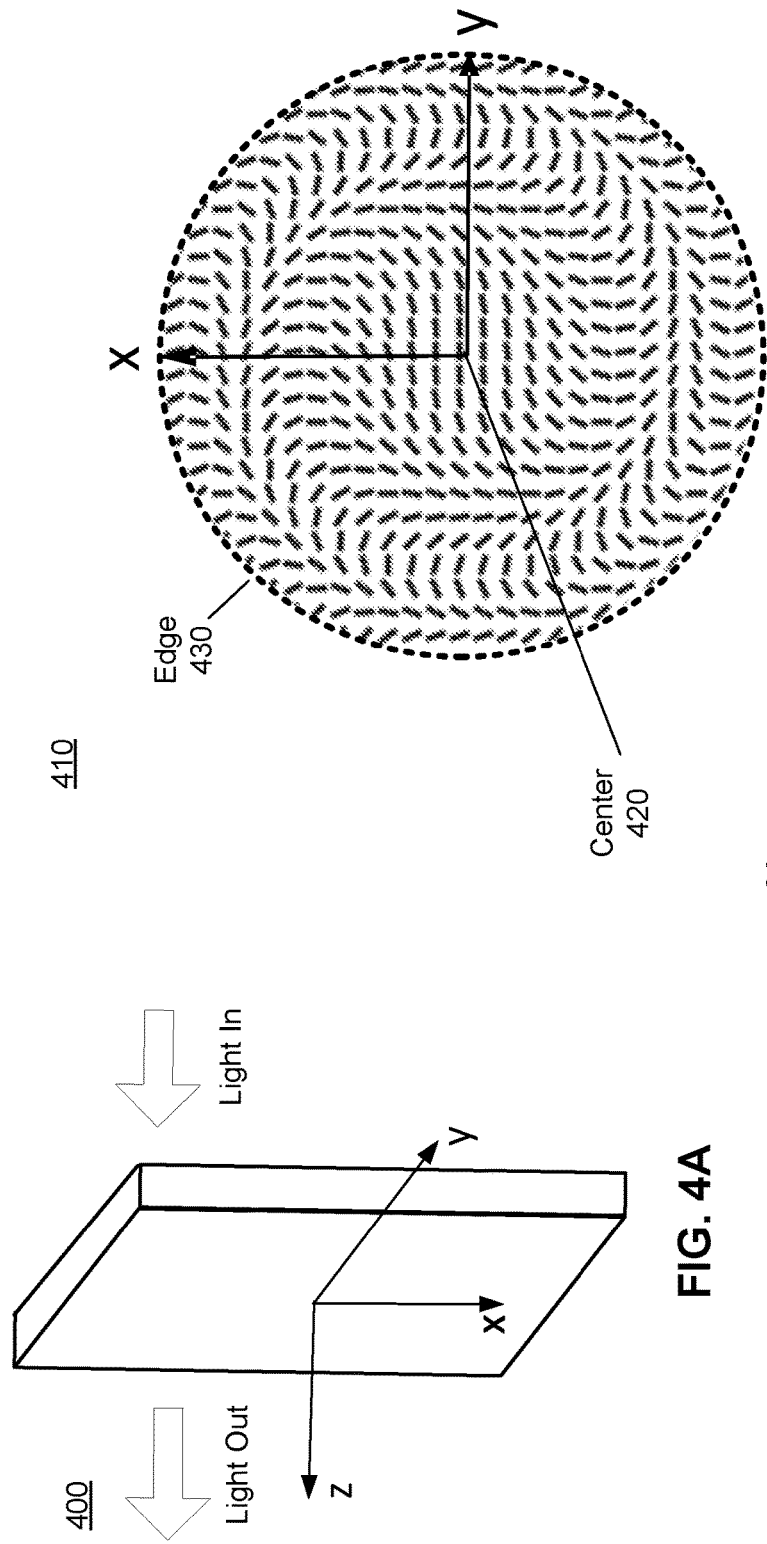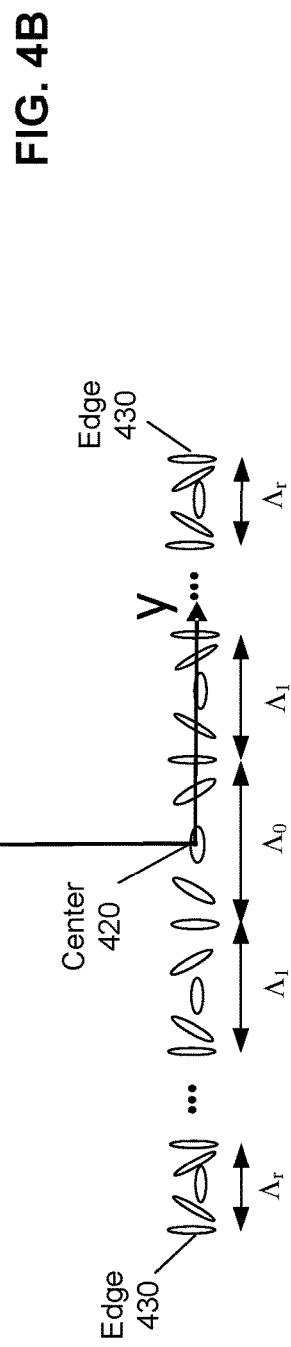
FIG. 4A
FIG. 4B
FIG. 4C

EYE EMULATOR DEVICES

BACKGROUND

The present disclosure generally relates to eye emulator devices, and specifically relates to eye emulator devices that use electro-optical liquid crystals.

Distortions caused by, e.g., optical elements (e.g., lenses) of a head-mounted display (HMD) can deform images presented by the HMD and can impair user experience. Conventionally, manufacturers of HMDs may test the HMDs (e.g., optical elements, displays, etc.) to determine whether they are within design specifications. But existing testing methods are divorced from design requirements stemming from a human eye viewing content in a HMD.

SUMMARY OF THE DISCLOSURE

Described herein is a human eye emulator device that emulates the human eye. The human eye emulator device is based on an electro-optical liquid crystal (or liquid membrane) eye model. The human eye emulator device emulates the human eye's vision to capture light. In particular, the human eye emulator device emulates the human eye's characteristics such as a vision accommodation, a directional sensitivity, an angular acuity, a pupil size, a pupil location, or some combination thereof. The human eye emulator device can be used to objectively test display devices such as a head mounted display (HMD). For example, the human eye emulator device captures image light emitted by a HMD and the captured image light can be used to objectively assess the HMD's performance.

In some embodiments, the human eye emulator device includes a Pancharatnam berry phase (PBP) liquid crystal (LC) lens, a liquid crystal (LC) shutter glass, and a liquid crystal (LC) lens. The PBP LC lens emulates the cornea. The PBP LC lens receives light and refracts the received light. The PBP LC lens has a fixed optical power and is configured to provide a majority of the total optical power of the human eye emulator device. The focusing efficiency of the PBP LC lens is angular dependent. In addition, the PBP LC lens has a different refractive index towards light of different polarization and directions.

The LC shutter glass emulates the pupil. Specifically, the LC shutter glass forms a dynamic aperture that transmits a portion of the light refracted by the PBP LC lens. The LC shutter glass includes different regions that can be switched between a light transmissive state and a light blocking state separately to adjust a location and a size of a light passing region. The light passing region allows light to pass through.

The LC lens emulates the crystalline lens. The LC lens receives the portion of light transmitted by the LC shutter glass and refracts the received portion of light through the LC shutter glass onto an imaging surface. The LC lens has an adjustable optical power and is configured to provide less than majority of the optical power of the human eye emulator device. The LC lens includes an LC lens that is coupled to an aspherical lens. In some embodiments, the LC lens includes a liquid membrane lens that is coupled to an aspherical lens. The liquid membrane lens can adaptively adjust optical power by deforming the membrane curvature.

BRIEF DESCRIPTION OF THE DRAWINGS

Figure (FIG.) 1 is a high-level block diagram illustrating a testing environment in which an eye emulator assembly is used for testing display devices, according to an embodiment.

FIG. 4A is an example PBP LC lens, according to an embodiment.

FIG. 4B is an example of liquid crystal orientations in the PBP LC lens of FIG. 4A, according to an embodiment.

FIG. 4C is a section of liquid crystal orientations taken along a y axis in the PBP LC lens of FIG. 4A, according to an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Described herein is a human eye emulator device that emulates the human eye. The human eye device can be used for objectively testing a display device, for example, that can be used in an artificial reality environment. The human eye emulator device is based on an electro-optical liquid crystal eye model. The human eye emulator device emulates the human eye's vision to capture light. In particular, the human eye emulator device emulates the human eye's characteristics such as a vision accommodation, a directional sensitivity, an angular acuity, a pupil size, a pupil location, or some combination thereof. The human eye emulator device includes a Pancharatnam berry phase (PBP) liquid crystal (LC) lens that emulates the cornea, a liquid crystal (LC) shutter glass that emulates the pupil, and a liquid crystal (LC) lens that emulates the crystalline lens.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Testing Environment Overview

Figure 1:
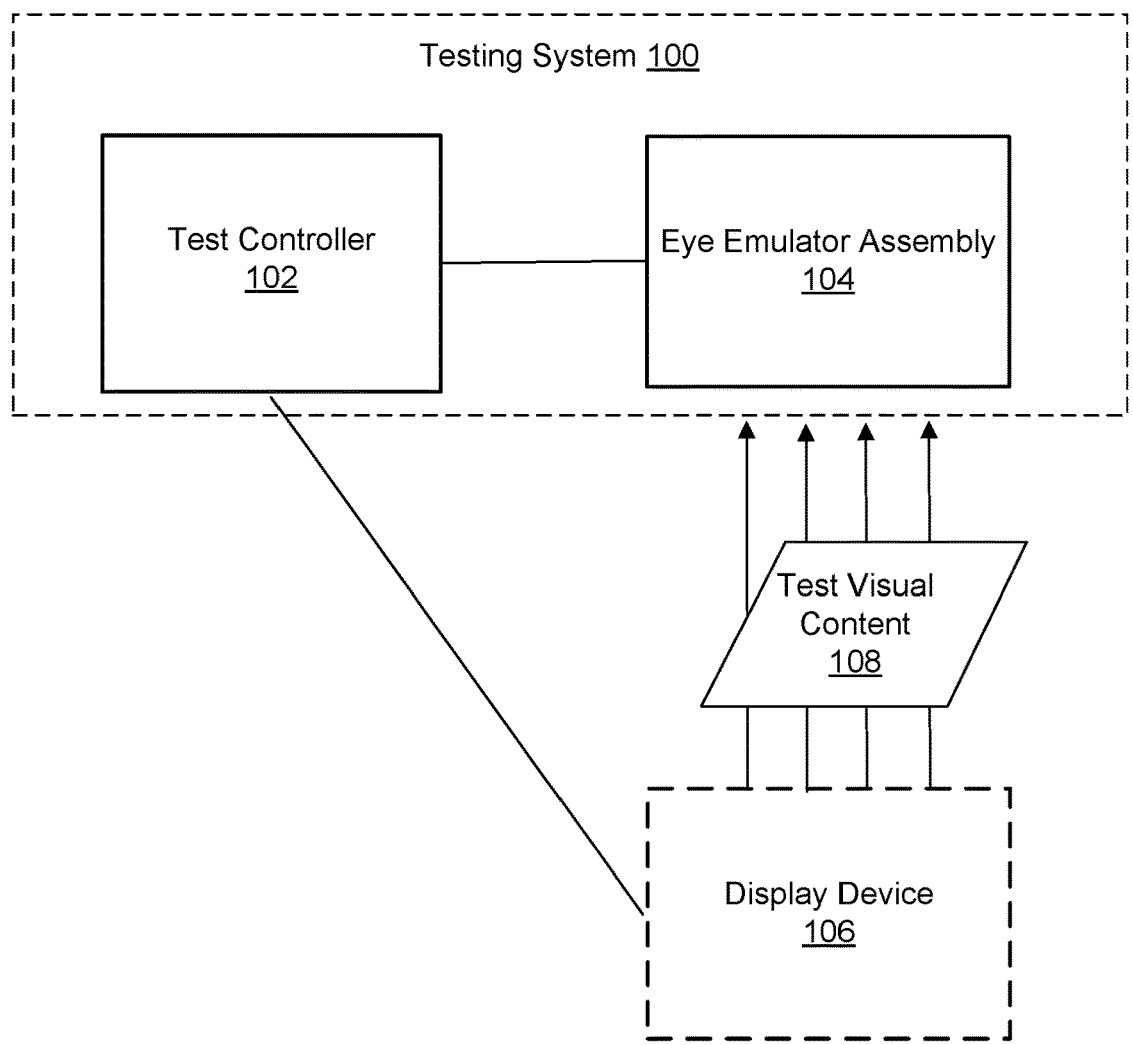
FIG. 1 is a high-level block diagram illustrating a testing system in which an eye emulator assembly is used for testing a display device, according to an embodiment.

FIG. 1 is a high-level block diagram illustrating a testing system 100 in which an eye emulator assembly 104 is used for testing a display device 106, according to an embodiment. The testing system 100 includes the eye emulator assembly 104 and a test controller 102. In other embodiments, the testing system 100 comprises additional or fewer devices than those described herein. Similarly, the functions can be distributed among the different entities in a different manner than is described here. For example, the test controller 102 may be part of the eye emulator device 104.

The test controller 102 and the eye emulator assembly 104 are used together for testing the display device 106. The display device 106 presents one or more test patterns in accordance with instructions from the test controller 102. The display device 106 can be a head-mounted display (HMD). An embodiment of the HMD is further described below with reference to FIGS. 4A-B. In other embodiments, the display device may be, e.g., a near-eye display on a pair of eyeglasses. In the illustrated example, only one display device 106 is shown, but multiple display devices 106 can be tested concurrently.

The eye emulator assembly 104 emulates one or more human eyes. The eye emulator assembly 104 captures image and generates data in response to the captured image. In particular, the eye emulator assembly 104 perceives the spatial and temporal changes in brightness and color in the captured images. The eye emulator assembly 104 includes one or more eye emulator devices. An eye emulator device emulates one human eye. The eye emulator device includes different elements that emulate the cornea, the pupil, the crystalline lens, the retina of the human eye, or some combination thereof. Each eye emulator device has a form factor that mimics physical dimensions of a human eye. Aspects of eye emulator devices are described in detail below with regard to FIGS. 2 through 6B. The eye emulator device receives light, converges the received light, and captures the converged light, all in a manner that emulates operation of a human eye. The captured light includes information that can be used to recreate an image corresponding to the received light.

Functionally, an eye emulator device corresponds to that of a cornea and crystalline lens focusing light on a retina of the eye. A field of view (FOV) of an eye emulator device can be matched to a human eye (46° superior (up, limited by the brow), 45° nasal (limited by the nose), 70° inferior (down), and 100° temporal (towards the temple)) or some other values (e.g., 40° superior, 50° nasal, 50° inferior, and 40° temporal). In embodiments, where two eye emulator devices are used to replicate left and right eyes for a user, the combined FOV (binocular) may be approximately 100° vertical and 200° horizontal to replicate the combined human FOV. In some embodiments, the eye emulator device may be able to adjust a focal distance to simulate an eye accommodating to different focal planes.

In some embodiments, the eye emulator device may include one or more filters that pass certain bands of light while blocking other bands of light. For example, the eye emulator device could include, e.g., a red bandpass filter (passes red light and blocks green and blue light), a blue bandpass filter, and a green bandpass filter, and a mechanism to select or de-select on or more of the filters. In cases where all of the bandpass filters are de-selected then unfiltered light from the display device 106 is captured by the eye emulator device.

The test controller 102 is a computing device that manages and administers tests. The test controller 102 facilitates communications of the test system 100 with operators and/or the display device 106 that is under test. For example, input parameters can be received via an interface of the test controller 102, e.g., from an operator of the test system 100 or a module associated with the test controller 102 and/or the eye emulator assembly 104. Input parameters are parameters received by the test controller 102 for characterization of the display device 106. Input parameters are parameters that the test controller 102 uses to characterize the display device 106. In some embodiments, input parameters identify one or more types of distortion to measure. Input parameters can include, e.g., resolution, illumination uniformity, color variation, focus differentiation, chromatic aberration, spherical aberration, astigmatism, and field curvature. In some embodiments, the input parameters may also identify one or more types of human eye movements. Examples of human eye movements include eye rotation, saccade, smooth pursuit movement, vergence movement, and vestibulo-ocular movement.

The test controller 102 controls the display device 106 using display instructions. The test controller 102 generates display instructions. In some embodiments, the test controller 102 receives instructions from a user of the test system 100, and uses the received instructions to generate the display instructions. The display instructions specify one or more test patterns for the display device 106 to present as test visual content 108. The test visual content 108 is designed to evaluate performance of the display device 106. The test visual content 108 includes one or more test patterns. Examples of the test patterns include dot pattern, star pattern, grid pattern, checkerboard pattern, sine pattern, bar pattern, text pattern, 1951 USAF (United States Airforce) resolution test chart, spoke wheels, or some other content that is used to characterize the display device 106. The display instructions may also provide a length of presentation time for each specified test pattern. In some embodiments, the test controller 102 selects test patterns based on types of distortion identified in the input parameters.

The test controller 102 generates the imaging instructions using the input parameters. For example, the test controller 102 may select a black bar pattern in response to an input parameter corresponding to assess chromatic aberration or select a grid pattern in response to an input parameter corresponding to assess pupil swim. In some other embodiments, the test controller 102 selects test patterns based on effects of distortion identified in input parameters. For example, a checkerboard pattern is selected for contrast, a bar pattern is selected for resolution, a grid pattern is selected for geometrical distortion, a star pattern is selected for focus differentiation. The test controller 102 may generate a test chart that includes test patterns for multiple types of distortion (or effects of distortion) identified in the input parameters, and generate presenting instructions that would cause the display device 106 to present the test chart. The test controller 102 provides the display instructions to the display device 106.

The test controller 102 regulates one or more control parameters of an individual eye emulator in the eye emulator assembly 104 using imaging instructions. The imaging instructions are used by the eye emulator assembly 104 to capture images of the test patterns presented by the display device 106. Control parameters control operation of an eye emulator device. Control parameters may include, e.g., a location of the eye emulator device relative to the display device 106, an accommodation of the individual eye emulator device, a location of the emulated pupil, a size of the emulated pupil, an orientation of the eye of the eye emulator device, or some combination thereof.

The test controller 102 generates imaging instructions using the input parameters. The test controller 102 determines the imaging instructions based on the input parameters. For example, the test controller 102 generates imaging instructions that cause an eye emulator device to rotate, in response to an input parameter corresponding to assess pupil swim or local performances (e.g., sharpness, chromatic aberration, etc.). The imaging instructions can, e.g., specify positions at which one or more eye emulation devices of the eye emulator assembly 104 capture images, timing to capture images, how many images are taken at each of the positions, some other command for the one or more characterization cameras, or some combination thereof. A position can include both translational moment and orientation, such as eye relief, interpupillary distance (IPD), and gaze angle. For example, for a given eye relief and IPD, the imaging instructions can cause one or more eye emulator devices to cycle through a range of angle values in pitch, yaw, and roll that correspond to ranges in angle similar to that of a human eye. The imaging instructions can then cause the one or more eye emulator devices to move to a different IPD and/or eye relief position and repeat the process. Additionally, the imaging instructions can cause the characterization camera to set to different aperture sizes, exposure settings, and/or frame rates. In embodiments where a characterization camera includes a bandpass filter, the imaging instructions control the characterization camera to select or deselect a bandpass filter. The test controller 102 provides the imaging instructions to the eye emulator assembly 104.

In some embodiments, the test controller 102 controls a position of the display device 106 thereby to control how one or more eye emulation devices of the eye emulator assembly 104. For example, one or more characteristics of the one or more eye emulation devices capturing images as described above such as positions, timing, or how many images are taken can be regulated. The test controller 102 analyzes the collected test data to evaluate the display device 106. In particular, the test controller 102 can determine one or more display visual performance characteristics for evaluation of the image rendering capability of the display device 106. The display visual performance characteristics include static characteristics and dynamic characteristics. The test controller 102 determines one or more of photometric values, colorimetric values, distortion, and spectral values such as a luminance, contrast, a radiance, a chrominance, a flicker, and a motion artifact.

In some embodiments, for each test pattern presented by the display device 106 under test, the test controller 102 compares an image of a test pattern captured by the eye emulator assembly 104 to a model image of the test pattern for the specific configuration at where the image was captured. The specific configuration can be a specific gaze angle for a specific eye relief distance and a specific IPD distance at specific settings for a pupil size and accommodation. The test controller 102 can retrieve the model image from a database. Alternatively, the test controller 102 can generate the model image based on design specifications for the display device 106. For example, in an embodiment where the display device 106 is instructed to present a grid pattern for measuring geometrical distortion and the design specification of the display device 106 indicates that its lenses have some percentage amount of geometrical distortion, the test controller 102 generates a model image including a grid pattern that is geometrically distorted in the same manner as specified by the design specification. In some embodiments, generation of the model image may also be based on the accommodation state. The model image can also be an image of the same test pattern presented by a model display device that is known to meet the design specification, and the image is captured at a same position by a same characterization camera.

Further, the test controller 102 measures one or more types of distortion in the image using the model image. The test controller 102 compares the image with the model image. For example, the test controller 102 identifies an amount of chromatic aberration by inspecting how the image changes for different colors (red, green or blue). As another example, the test controller 102 measures filed curvature by inspecting how focus of the camera changes as a function of it being off axis. As another example, the test controller 102 identifies pupil swim by inspecting differences between a captured image and a model image captured at a nominal eye position or zero eye rotation.

In some embodiments, the test controller 102 measures distortion based on multiple images of the test pattern captured by the eye emulator assembly 104. For example, the test controller 102 measures distortion based on each captured image and determine an average of the measured distortion. Similarly, the test controller 102 may use multiple model images for the test pattern. Besides using the model image, the test controller 102 may generate a MTF (modulation transfer function) chart based on the captured image. Using the MTF chart, the test controller 102 can measure distortion in the lenses of the display device 106.

In some embodiments, the test controller 102 takes remedial actions based on measured distortion. For example, the test controller 102 pre-distorts the image of the display to account for some or all of the measured distortion. For example, pupil swim can be corrected by image processing on display.

The test controller 102 further generates a report that characterizes the lens based on the measured distortion. For example, the report includes the types of the measured distortion and quantitative or qualitative measurement results. The report may also include some captured images. The test controller 102 can also further determine whether the display device 106 is qualified based on the measured distortion. For example, the test controller 102 compares the measured distortion with corresponding design tolerance. The display device 106 is determined qualified when the measured distortion is within the design tolerance; otherwise, the display device 106 is determined unqualified. The report and/or determination provides an objective measure of distortion of optical elements that are incorporated into a display device. The report and/or determination may be provided to an operator of the test system 100.

Eye Emulator Device

Figure 2:
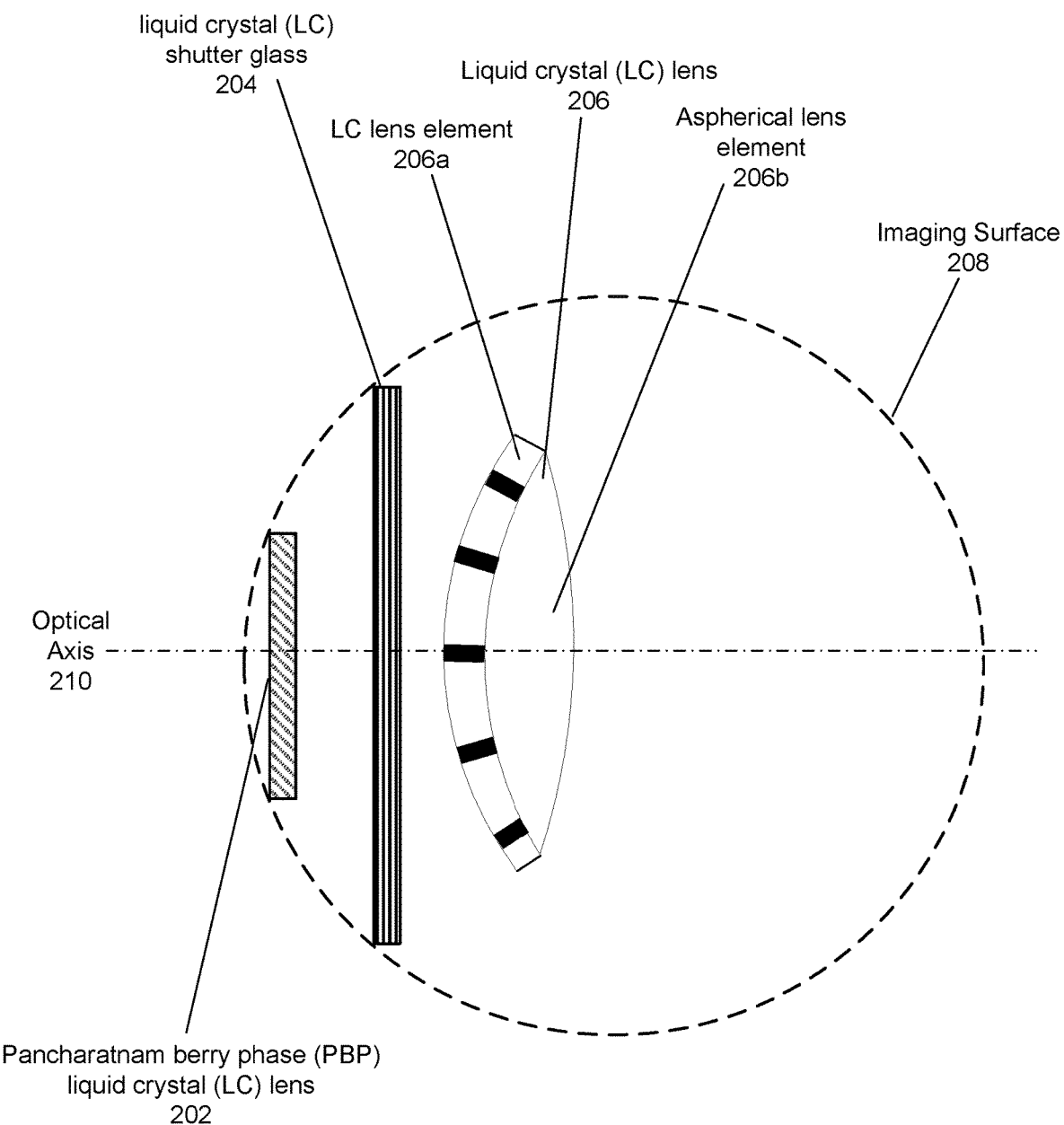
FIG. 2 is a cross-section view of an example eye emulator device, according to one embodiment.

FIG. 2 is a cross-section view of an example eye emulator device 200, according to one embodiment. The eye emulator device 200 includes a Pancharatnam berry phase (PBP) liquid crystal (LC) lens 202, a liquid crystal (LC) shutter glass 204, a liquid crystal (LC) lens 206, and an imaging surface 208. In some embodiments, the imaging surface 208 encloses the PBP LC lens 202, the LC shutter glass 204, and the LC lens 206.

In some embodiments, the eye emulator device 200 further comprises a housing that encloses the eye emulator device 200 the PBP LC lens 202, the LC shutter glass 204, and the LC lens 206. The imaging surface 208 is coupled to the housing. The form factor of the eye emulator device 200 mimics that of a human eye. For example, the distance between the PBP LC lens 202 and the imaging surface 208 may correspond to a distance between a cornea and a retina in a human eye (~17 mm). Similarly, the eye emulator device 200 may have a center of rotation that is located in a same position between the PBP LC lens 202 and the imaging surface 208 as a location of a center of rotation between the retina and the cornea.

The PBP LC lens 202 emulates the cornea of the human eye. In particular, the PBP LC lens 202 receives light and refracts the received light. The refracted light passes through the LC shutter glass 204 and onto the LC lens 206. The PBP LC lens 202 is configured to provide a majority of a total optical power of the eye emulator device 200, in the same manner that the cornea provides the majority of the total optical power for an eye (e.g., ~43 diopters). For example, the PBP LC lens 202 may be configured to provide ~66% of the total optical power, and the remaining ~33% of the optical power would be provided by the LC lens 206. In some embodiments, the PBP LC lens 202 may be configured to provide more (e.g., 80% of the total optical power) or less optical power. The received light can be circularly polarized light. For example, the display device 106 emits circularly polarized light. The eye emulator device 200 may include a circular polarizer that outputs circularly polarized light.

The PBP LC lens 202 is configured such that its focusing efficiency is angular-dependent. That is, the PBP LC lens 202 has a varying degree of focusing efficiency toward light of different incident angles. The incident angle is the angle between the incoming light incident on a surface of the PBP LC lens 202 and a line perpendicular to the PBP LC lens 202. By doing this, the PBP LC lens 202 can emulate the human eye's spatial resolving capacity. For example, the human eye with normal acuity 20/20 (1 minute of arc) can distinguish two points separated by an angle of one minute of arc, which is the sharpest eyesight observed in the foveola. To emulate a human eye's angular acuity difference, LC molecules of the PBP LC lens 202 are pre-tilted with reference to the optical axis 210 of the eye emulator device 200. That is, the easy axis of the LC alignment is pre-tilted with reference to the optical axis 210 of eye emulator device 200. The optical axis 210 of the eye emulator device 200 is also the optical axis of the PBP LC lens 202. The pre-tilt angle is selected based on the birefringence data of the LC materials or LC polymer mixtures used to fabricate the PBP LC Lens 202. In some embodiments, LC materials of a low birefringence is used to improve the focusing efficiency.

To improve the PBP LC lens' 202 angular dependent efficiency, in some embodiments, the pre-tilt angle of the LC molecules is constant or substantially constant (e.g., about 10~15 degrees based on the LC materials.) In some embodiments, the pre-tilt angles increase from a center to an edge of the PBP LC lens 202. That is, the pre-tilt angles for the LC molecules increase with a radius distance from the center of the PBP LC lens 202. A degree of increase in pre-tilt angles between neighboring LC molecules may also increase with the radius distance from the center of the PBP LC lens 202. As such, the PBP LC lens 202 has a higher focusing efficiency towards incoming light that is parallel to the optical axis 210 compared to light that is not parallel to the optical axis 210. In some embodiments, LC molecules across an aperture of the PBP LC lens 202 are pre-tilted. A pre-tilt angle for an LC molecule is in the range of 0-15 degrees.

The azimuthal angle of an LC molecule is pre-determined based on a focusing power for a wavelength or for a wavelength band. For a particular LC molecule, its azimuthal angle θ can be determined according to Equation (1):

$$\theta = (r^2/f*(\pi/\lambda))/2 \quad (1)$$

where r denotes a radius of the PBP LC lens 202, f denotes the lens power of the PBP LC lens 202, and λ denotes the wavelength of the light. In various embodiments, the wavelength λ is selected to be 550 nm (nanometer), which is the wavelength that provides a maximum spectral sensitivity to the human eye. In some embodiments, the azimuthal angles increase from a center to an edge of the PBP LC lens 202. That is, the azimuthal angles for the LC molecules increase with a radius distance from the center of the PBP LC lens 202. A degree of increase in azimuthal angles between neighboring LC molecules may also increase with the radius distance from the center of the PBP LC lens 202.

In addition, the PBP LC lens 202 is also configured to refract incoming light of which polarization is in a predetermined range. In this way, the PBP LC lens 202 emulates the directional sensitivity of the human eye. That is, the human eye is more responsive to light from certain directions than the other directions. For example, for light of the same intensity, the human eye is more responsive to the light that enters near the center of the pupil than the light that enters near the edge of the pupil. In various embodiments, liquid crystal polymers with a predetermined birefringence (e.g. Δn<=0.1) is used.

In one embodiment, the PBP LC lens 202 is generally sized to emulate a cornea of a human eye. For example, the PBP LC lens 202 may have an aperture size of substantially 10 mm (millimeter) in diameter. In one embodiment, the PBP LC lens 202 has an optical power of substantially 50 diopters. In one embodiment, the PBP LC lens has a focal ratio of substantially 2, a fixed optical power of substantially −50 diopters, and an aperture size of substantially 10 mm.

The PBP LC lens 202 can be active or passive. An active PBP LC lens has three optical states: an additive state, a neutral state, and a subtractive state. A passive PBP LC lens has two optical states: an additive state and a subtractive state. Details of the PBP LC lens 202 are provided with respect to FIGS. 3 through 4C.

The liquid crystal (LC) shutter glass 204 emulates the pupil of the human eye. The LC shutter glass 204 forms a dynamic aperture that transmits a portion of the light refracted by the PBP LC lens 202. In particular, the LC shutter glass 204 regulates an amount of the light that can pass through the LC shutter glass 204 onto the LC lens 206. The LC shutter glass 204 can be adjusted to adjust a size and a location of a light passing region that allows light to pass through the LC shutter glass 204. The rest of the LC shutter glass 204 blocks light. In various embodiments, the LC shutter glass 204 includes multiple regions that can switched between a light transmissive state and a light blocking state separately. A region includes one or more pixels. If a region is in the light transmissive state, the region allows light to pass through. If a region is in the light blocking state, the region does not allow light to pass through. Because the regions can be controlled separately, a location, a size, and a shape of the light passing region can be adjusted. The size of the light passing region is typically between 2 mm² to 8 mm². In various embodiments, a region of the LC shutter glass 204 includes one LC pixel. One LC pixel includes a layer of molecules and two polarizing filters. The layer of molecules are aligned between two transparent electrodes. The two polarizing filters are positioned to be in parallel to and perpendicular to the layer of molecules, respectively. The axes of transmission of the two polarizing filters are perpendicular to each other. In one embodiment, the LC shutter glass 204 has an active area of substantially 100 mm$^2$ (e.g., 10 mm×10 mm), and each pixel has a size of substantially 100 μm$^2$ (e.g., 10 μm×10 μm.) A pixel can have a size that is up to 10000 μm$^2$ (e.g., 100 μm×100 μm.) The LC shutter glass 204 has a cross-section that can be substantially circular, rectangular, or otherwise shaped. An LC pixel can be substantially circular, rectangular, or otherwise shaped.

The LC lens 206 emulates the crystalline lens of the human eye. In particular, the LC lens 206 refracts light onto the imaging surface 208. The light is received through the LC shutter glass 204 from the PBP LC lens 202. The LC lens 206 has tunable optical power. The tunable optical power allows the LC lens 206 to focus image light on the imaging surface 208 for a variety of object distances (i.e., a distance of an object from the eye emulator device 200). In some embodiments, the LC lens 206 includes a LC lens element 206a and an aspherical lens element 206b. The LC lens element 206a is coupled to the aspherical lens element 206b. In some embodiments, the LC lens 206 includes a liquid membrane lens. In some embodiments, the LC lens 206 includes a liquid membrane lens and the aspherical lens element 206b. The LC lens element 206a (or the liquid membrane lens) has a tunable optical power whereas the aspherical lens element 206b has a fixed optical power. As a result, the LC lens 206 has a tunable optical power. The tunable optical power is such that it at least covers the range of accommodation prior to presbyopia. In some embodiments, the optical power of the LC lens element 206a (or the liquid membrane lens) is in the range of −5 to 5 diopters, and the optical power of the LC lens element 206b is 15 diopters. The LC lens 206 has a total optical power that is in the range of 10 to 20 diopters. In some embodiments, the aspherical lens element 206b is made of fused silica and has a refractive index of about 1.458.

The imaging surface 208 emulates the retina of the human eye. In particular, the imaging surface 208 collects the light refracted by the LC lens 206. In addition, the imaging surface 208 transmits the collected light to another device such as the test controller 102 for further analysis.

In some embodiments, the imaging surface 208 may be detector array (e.g., CCD, CMOS, etc). The detector array may be curved (e.g., spherically) to match a geometry of a retina of a human eye. A spherically curved detector array may not be practical (e.g., due to expense and difficulty of manufacture). Accordingly, in some embodiments (not shown) the imaging surface 208 may be flat and may further include an optical assembly that captures light from the LC lens 206 and focuses it on the flat imaging surface 208. Alternatively, a fiber taper may be used to capture light on a curved focal plane that is later detected on a flat or possibly cylindrically curved detector array.

In some embodiments, the imaging surface 208 is an input surface of a fiber taper. A fiber taper is a bundle of fibers that has a light input surface (i.e., where light enters the fibers) and an output surface (i.e., where light later exits the fibers). The input surface is shaped to mimic a surface geometry of a retina in a human eye. The input surface of the fiber taper is shaped to match a shape of an effective focal plane of the PBP LC lens 202 and LC lens 206.

The output surface of the fiber taper is coupled to a plurality of photodetectors. In some embodiments, the plurality of photodetectors are components of the detector array. Coupling between fibers and the photodetectors may include, e.g., individual couplings of a fiber to a respective photodetector of the plurality of photodetectors, one or more groups of fibers and each group of fibers are coupled to a respective photodetector, or some combination thereof. The photodetectors detect light and convert the detected light into electric signals. The plurality of photodetectors transmit the electrical signals (i.e., the detected image) to the test controller 102.

In some embodiments, the imaging surface 208 has a varying resolution. That is, the imaging surface 208 can have a high resolution area and a low resolution area. The high resolution area has a higher resolution than the low resolution area. The high resolution area and the low resolution area can be configured so that the decrease in resolution between the two areas substantially match that of a human eye. The high resolution area corresponds to a foveal region of the human eye and the low resolution area corresponds to a perifovea region of the human eye. In cases where the imaging surface is part of a fiber taper, the high resolution area may have a higher density of fibers compared to the low resolution area. Each fiber in the high resolution area is coupled to a photodetector and multiple fibers in the low resolution area are coupled to a photodetector.

In some embodiments, color filters may be used with associated photodetectors to create color receptors. A color receptor is a photodetector that receives light of a particular color channel. For example, red, green, and blue filters can cause associated photodetectors to act as L-cones, M-cones and S-cones, respectively, of a human eye. In some cases, the high resolution area of the imaging surface can be associated with a higher density of color receptors than the low resolution area. In some embodiments, a mapping of color receptors in the imaging surface 208 is such that it emulates a mapping of cones in a retina of a human eye. In some embodiments, the imaging surface 208 has a uniform resolution.

Figure 3:
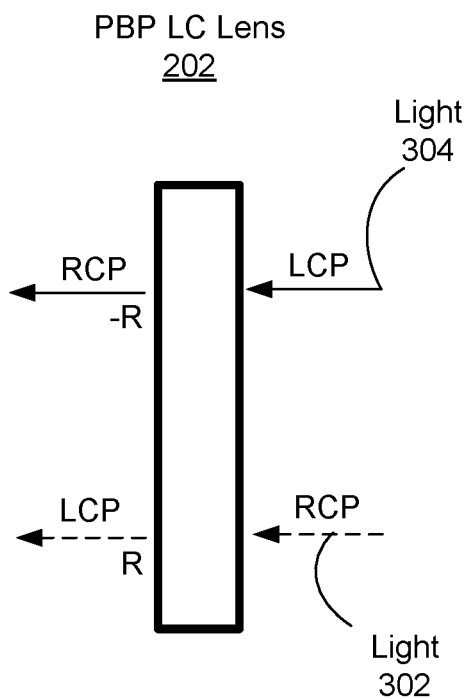
FIG. 3 illustrates a PBP LC lens, according to an embodiment.

FIG. 3 illustrates a PBP LC lens 202, according to an embodiment. The PBP LC lens 202 has three states: an additive state, a subtractive state, and a neutral state. In an additive state, the PBP LC lens 202 adds optical power R and has a positive focus of "f," where R (step resolution) is a positive number (e.g., 0.1, 0.25, 0.5 etc.). Conversely, in a subtractive state, the PBP LC lens 202 subtracts −R of optical power and has a negative focus of '−f.' In the neutral state, the PBP LC lens 202 does not add or subtract optical power. The additive and subtractive states are also referred to as active states because the PBP LC lens 202 changes the optical power of incident light.

The state of the PBP LC lens 202 is determined by whether the incident light has left circular polarization (LCP) or right circular polarization (RCP), and applied voltage. The PBP LC lens 202 operates in the additive state (f) responsive to incident light 302 with a right handed circular polarization and an applied voltage of zero (or more generally below some minimal value), operates in the subtractive state (−f) responsive to incident light 304 with a left handed circular polarization and the applied voltage of zero (or more generally below some minimal value), and operates in a neutral state (0) (regardless of polarization) responsive to an applied voltage larger than a threshold voltage which aligns liquid crystal with positive dielectric anisotropy along with the electric field direction. Note that if the PBP LC lens 202 is in the additive or subtractive state, light output from the PBP LC lens 202 has a handedness opposite that of the light input into the PBP LC lens 202. In contrast, if the PBP LC lens 202 is in the neutral state, light output from the PBP LC lens 202 has the same handedness as the light input into the PBP LC lens 202.

In some embodiments, the PBP LC lens 202 is a passive PBP LC lens having two optical states, specifically, the additive state and the subtractive state. The state of a passive PBP LC lens 202 is determined by the handedness of polarization of light incident on the passive PBP LC lens 202. A passive PBP LC lens operates in a subtractive state responsive to incident light with a left handed polarization and operates in an additive state responsive to incident light with a right handed polarization. Note that the passive PBP LC lens 202 outputs light that has a handedness opposite that of the light input into the passive PBP LC lens 202 lens.

FIG. 4A is an example PBP LC lens 400, according to an embodiment. The PBP LC lens 400 is an example of a PBP LC lens 202 shown in FIGS. 2-3. The PBP LC lens 400 creates a respective lens profile via an in-plane orientation ($\theta$, azimuth angle) of a liquid crystal molecule, in which the phase difference $T=2\theta$. In contrast, a (non-PBP) liquid crystal lens creates a lens profile via a birefringence ($\Delta n$) and layer thickness (d) of liquid crystals, and a number (#) of Fresnel zones (if it is Fresnel lens design), in which the phase difference $T=\Delta nd*\#*2\pi/\lambda$. Accordingly, in some embodiments, a PBP LC lens 400 may have a large aperture size and can be made with a very thin liquid crystal layer (e.g., a liquid crystal layer of which the thickness is in the range of 2-20 µm).

Design specifications for HMDs used for artificial reality applications typically specifies a large range of optical power to adapt for human eye vergence-accommodation (e.g., ~±2 Diopters or more), fast switching speeds (e.g., ~300 ms), and a good quality image. The PBP LC lens may be desirable over other types of liquid crystal lenses having relatively high index of refraction or be relatively larger thick (which reduces switching speeds).

FIG. 4B is an example of liquid crystal orientations 410 in the PBP LC lens 400 of FIG. 4A, according to an embodiment. In the PBP LC lens 400, an azimuth angle ($\theta$) of a liquid crystal molecule is continuously changed from a center 420 of the PBP LC lens 400 to an edge 430 of the PBP LC lens 400, with a varied pitch A. Pitch is defined in a way that the azimuth angle of LC is rotated 180° from the initial state.

FIG. 4C is a section of liquid crystal orientations 440 taken along a y axis in the PBP LC lens 400 of FIG. 4A, according to an embodiment. The liquid crystal orientation 440 has a rate of pitch variation as a function of distance from the lens center 420. The rate of pitch variation increases with distance from the lens center. For example, pitch at the lens center ($\Lambda_0$), is the slowest and pitch at the edge 420 ($\Lambda_r$) is the highest, i.e., $\Lambda_0 > \Lambda_1 > \ldots > \Lambda_r$. In the x-y plane, to make a PBP LC lens with lens radius (r) and lens power (+/−f), the azimuth angle needs to meet: $2\theta = r^2/f*(\pi/\lambda)$, where $\lambda$ is the wavelength of light. Along with the z-axis, a dual twist or multiple twisted structure layers offers achromatic performance on efficiency in the PBP LC lens 400. Along with the z-axis, the non-twisted structure is simpler to fabricate then a twisted structure, but is optimized for a monochromatic light.

Note that a PBP LC lens may have a twisted or non-twisted structure. In some embodiments, a LC lens element may include one or more PBP LC lenses having a twisted structure, one or more PBP LC lenses having a non-twisted structure, or some combination thereof.

Figure 5A:
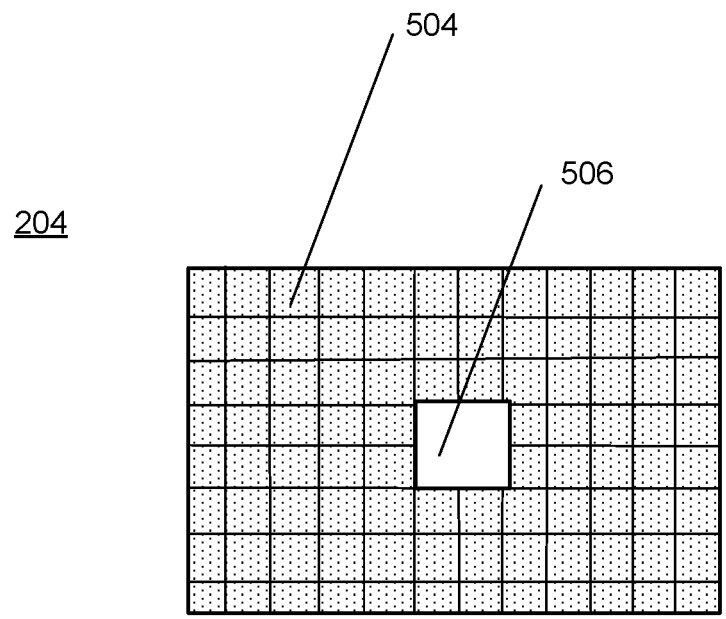
FIG. 5A is a plan view of an example LC shutter glass having an adjustable light passing region, according to one embodiment.

FIG. 5A is a plan view of an example LC shutter glass 204 having an adjustable light passing region, according to one embodiment. As illustrated, the example LC shutter glass 204 includes a grid of pixels 504 that can independently switched between a light transmissive state and a light blocking state thereby to adjust a size, a location, and a shape of a light passing region (e.g., a light passing region 506). In the illustrated example, the LC shutter glass 204 has a substantially rectangular-shaped cross section, and each pixel 504 is substantially rectangular shaped. And the illustrated light passing region 506 is rectangular shaped. In other embodiments, the light passing region 506 is circular to more closely emulate a pupil of a human eye. As illustrated in FIG. 3A, the light passing region 306 is defined by four pixels 304 that are in the light transmissive state. The four pixels 304 are located in a center of the LC shutter glass 204. Note that in other embodiments, the LC shutter glass 204 may have more or less pixels.

Figure 5B:
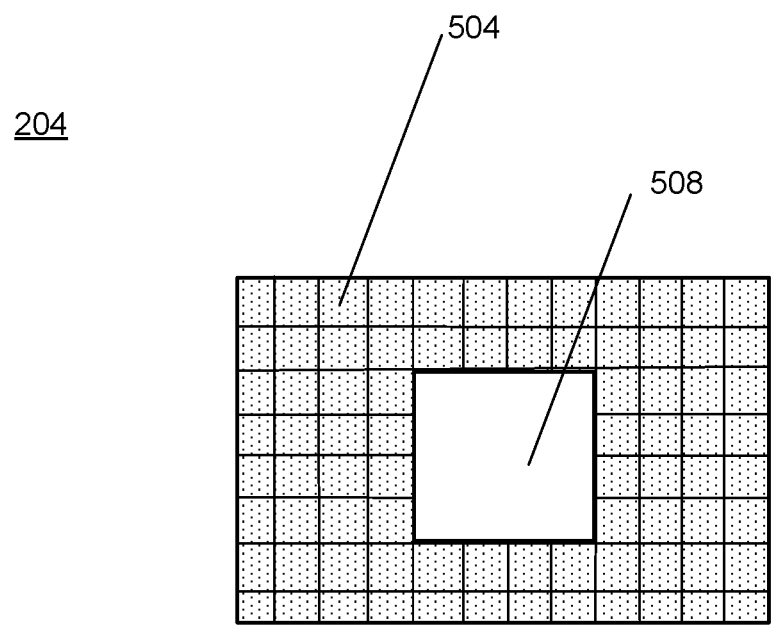
FIG. 5B is a plan view of an example LC shutter glass having an adjustable light passing region, according to one embodiment.

FIG. 5B is a plan view of the example LC shutter glass 204 shown in FIG. 5A having a different light passing region 508, according to one embodiment. Compared to the light passing region 506, the light passing region 508 has a larger size. As illustrated in FIG. 3B, the light passing region 508 is defined by sixteen pixels 504 that are in the light transmissive state. The sixteen pixels 504 are also located in the center of the LC shutter glass 204. In the illustrated examples, both the light passing region 506 and the light passing region 508 are located in the center of the LC shutter glass 204. Other pixels located in other locations of the LC shutter glass 204 can be turned on and off to adjust a location and a size of the light passing region.

Head-Mounted Display Overview

Figure 6A:
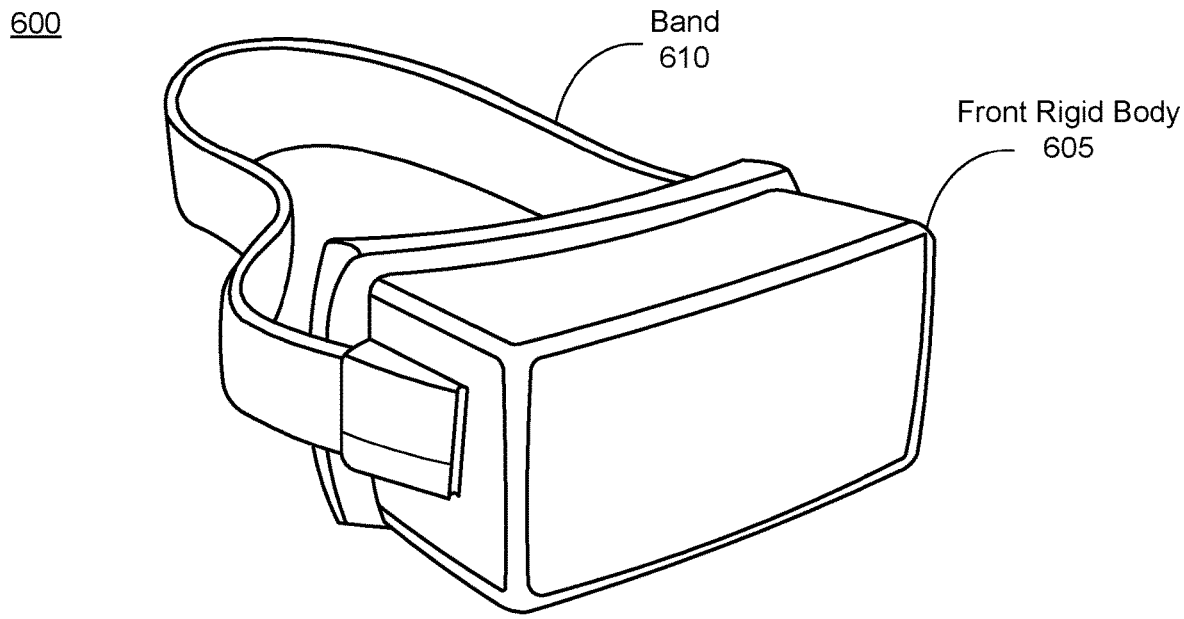
FIG. 6A is a diagram of a display device under testing.

FIG. 6A is a diagram of a display device 106 under testing. The HMD 600 is an example device 106, and includes a front rigid body 605 and a band 610. The front rigid body 605 includes one or more electronic display elements of the display (not shown in FIG. 6A). The HMD 600 is a head-mounted display that presents media to a user. Examples of media presented by the HMD include one or more images, video, audio, or some combination thereof. The display displays images to the user in accordance with data received from. The display may include one or more electronic display panels. The display includes a display block and an optics block. The display block includes one or more electronic display panels, and the optics block includes one or more optical elements that transmit images from the display block to eyes of the user. In some embodiments, some or all of the functionality of the display block is part of the optics block or vice versa. Example electronic display panels include: a liquid crystal display (LCD), an organic light emitting diode (OLED) display, an active-matrix organic light-emitting diode display (AMOLED), a transparent organic light emitting diode display (TOLED), some other display panels, a projector, or some combination thereof.

Figure 6B:
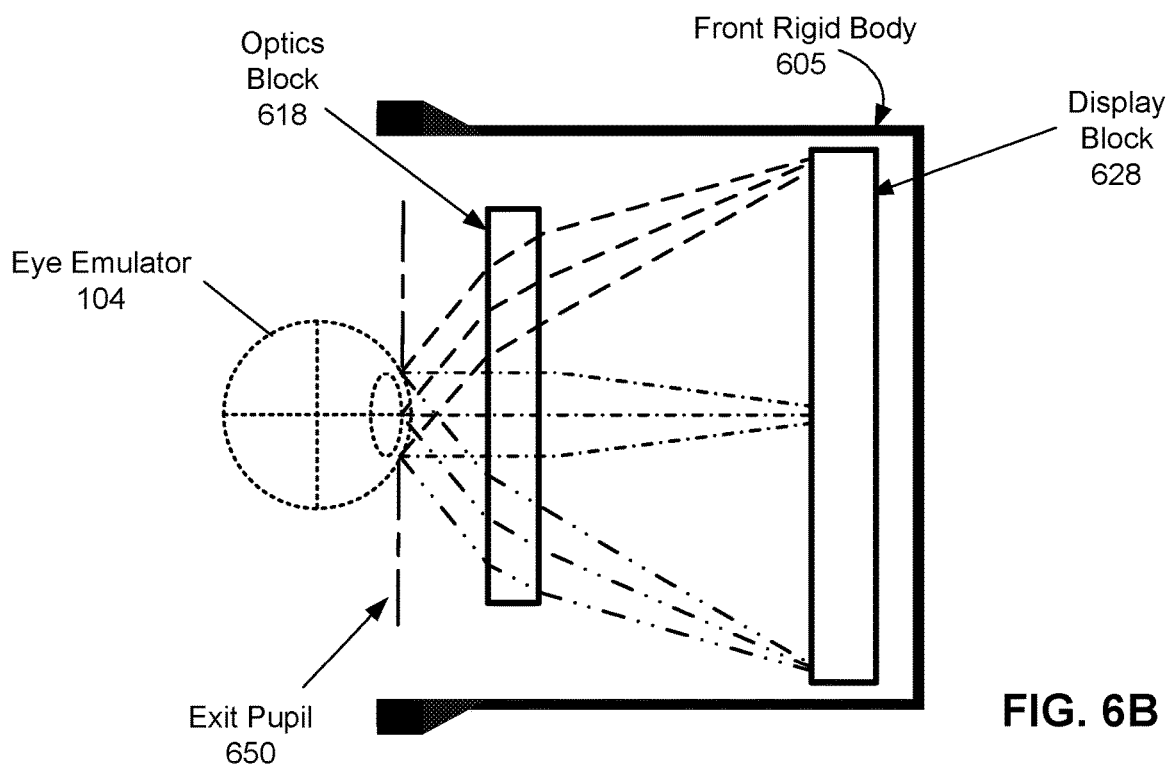
FIG. 6B is a cross section of a front rigid body of the display device shown in FIG. 6A.

FIG. 6B is a cross section 625 of the front rigid body 605 of the HMD 600 shown in FIG. 6A. As shown in FIG. 6B, the front rigid body 605 includes a display image light to an exit pupil 650. The display includes a display block 628 and an optics block 618. The exit pupil 650 is the location of the front rigid body 605 where a user's eye or the eye emulator 104 is positioned. For purposes of illustration, FIG. 2B shows a cross section 625 associated with a single eye emulator 104, but the same display or another separate display can provide image light to another eye of the user or a second eye emulator.

The display block 628 generates image light. The display block 628 may also include display block optical elements for magnifying light and/or for minimizing pupil swim. A display block optical element may be an aperture, a Fresnel lens, a convex lens, a concave lens, a filter, a polarizer, a diffuser, a fiber taper, or any other suitable optical element that affects the image light emitted from the electronic display. In some embodiments, one or more of the display block optical elements may have one or more coatings, such as anti-reflective coatings. In some embodiments, the image light is circular polarized light.

The optics block 618 optically directs image light output from the display block 628 to an exit pupil 650. The optics block 618 may include at least one optical element that may be an aperture, a Fresnel lens, a convex lens, a concave lens, a filter, or any other suitable optical element that affects the image light emitted from the display block 628. Moreover, the optics block 618 may include combinations of different optical elements. In some embodiments, one or more of the optical elements in the optics block 618 may have one or more coatings, such as anti-reflective coatings. The optics block may magnify image light output from the display block 628. Magnification of the image light by the optics block 618 allows elements of the display block 628 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 618 is designed so its effective focal length is larger than the spacing to the display block 628, which magnifies the image light projected by the display block 628. Additionally, in some embodiments, the amount of magnification may be adjusted by adding or removing optical elements.

The display block 628 and the optics block 618 may take on different configurations within the display.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device comprising:
   a Pancharatnam berry phase (PBP) lens to receive light;
   a shutter configured to form a dynamic aperture that transmits a portion of the light received from the PBP lens; and
   a lens configured to receive the portion of light transmitted by the shutter and to apply optical power to the received portion of light, the lens comprising:
   an aspherical lens element configured to apply a fixed optical power, and
   a liquid membrane lens element configured to apply an adjustable optical power based on adjusting deformation of a curvature of a membrane of the liquid membrane lens element.

2. The device of claim 1, wherein the lens directs the light onto an imaging surface that is an input surface of a fiber taper, and the fiber taper includes the input surface and an output surface, the input surface shaped to emulate a retina of the eye and to couple light into the fiber taper and the output surface is configured to emit light from the fiber taper toward a plurality of photodetectors.

3. The device of claim 2, further comprising a plurality of color filters that are coupled to respective photodetectors of the plurality of photodetectors.

4. The device of claim 2, wherein the imaging surface comprises a high resolution region and a low resolution region, and a density of fibers in the high resolution region is higher than a density of fibers in the low resolution region.

5. The device of claim 1, wherein the PBP lens applies a fixed optical power.

6. The device of claim 5, wherein the PBP lens provides a majority of a total optical power of the device.

7. The device of claim 1, wherein an azimuthal angle of a PBP molecule in the PBP lens is configured according to a focusing power of the PBP lens for a wavelength.

8. The device of claim 7, wherein the PBP lens comprises a plurality of PBP molecules pre-tilted with reference to an optical axis of the PBP lens.

9. The device of claim 8, wherein a pre-tilt angle of the PBP molecules increase with a radius distance from a center of the PBP lens.

10. The device of claim 9, wherein a degree of increase in pre-tilt angles of the PBP molecules increases with a radius distance from a center of the PBP lens.

11. The device of claim 1, wherein the PBP lens is configured such that a focusing efficiency of the PBP lens decreases with an incident angle of the received light.

12. The device of claim 1, wherein the PBP lens comprises a liquid crystal polymer, a birefringence of the liquid crystal polymer less than a threshold birefringence value.

13. The device of claim 1, wherein the shutter includes multiple regions, wherein each region of the multiple regions comprises a liquid crystal pixel switchable between a light transmissive state and a light blocking state.

14. The device of claim 1, wherein the optical power applied by the lens is adjustable.

15. The device of claim 1, wherein the PBP lens is switchable between a plurality of optical states, and the plurality of optical states includes:
    an additive state that adds optical power; and
    a subtractive state that subtracts optical power.

16. The device of claim 15, wherein the plurality of optical states further includes a neutral state that does not provide optical power.

17. The device of claim 1, wherein the dynamic aperture is substantially circular in shape.

* * * * *